US009056236B2

(12) United States Patent
Helms

(10) Patent No.: US 9,056,236 B2

(45) Date of Patent: Jun. 16, 2015

(54) DEVICE AND METHOD FOR MARKING SPHERES WITH ALIGNMENT INDICIA AND THE SPHERE SO MARKED

(71) Applicant: David J Helms, Clarence, NY (US)

(72) Inventor: David J Helms, Clarence, NY (US)

( * ) Notice: Subject to any disclaimer, the term of this patent is extended or adjusted under 35 U.S.C. 154(b) by 201 days.

(21) Appl. No.: 13/654,829

(22) Filed: Oct. 18, 2012

(65) Prior Publication Data

US 2013/0102416 A1 Apr. 25, 2013

Related U.S. Application Data

(60) Provisional application No. 61/551,064, filed on Oct. 25, 2011.

(51) Int. Cl.

| | |
|---|---|
| ***G01B 3/14*** | (2006.01) |
| ***A63B 69/36*** | (2006.01) |
| ***A63B 37/00*** | (2006.01) |
| ***A63B 45/02*** | (2006.01) |
| ***B43L 13/20*** | (2006.01) |
| *B43L 9/00* | (2006.01) |
| *G01B 1/00* | (2006.01) |
| *B25D 5/00* | (2006.01) |
| *A63B 43/00* | (2006.01) |
| *A63B 71/06* | (2006.01) |

(52) U.S. Cl.

CPC ......... *A63B 69/3658* (2013.01); *A63B 37/0022* (2013.01); *A63B 43/008* (2013.01); *A63B 45/02* (2013.01); *A63B 2071/0694* (2013.01); *B43L 13/205* (2013.01)

(58) Field of Classification Search

CPC .............. G01B 3/30; G01B 3/14; B25H 7/00; B43L 1/12; G09B 27/08; B23K 7/005

USPC .................................. 33/562, 21.2, 574, 508

See application file for complete search history.

(56) References Cited

U.S. PATENT DOCUMENTS

| | | | | |
|---|---|---|---|---|
| 4,209,172 | A * | 6/1980 | Yamamoto | 473/200 |
| 6,213,012 | B1 * | 4/2001 | Arms | 101/35 |
| 6,231,459 | B1 * | 5/2001 | Pettigrew et al. | 473/351 |
| 6,676,544 | B2 * | 1/2004 | Tyke | 473/406 |
| D558,291 | S * | 12/2007 | Burnett | D21/789 |
| D569,469 | S | 5/2008 | Dingman | |
| D627,020 | S * | 11/2010 | Martin | D21/713 |
| 2002/0086741 | A1 * | 7/2002 | Newcomb | 473/351 |
| 2003/0022724 | A1 * | 1/2003 | Rennecamp | 473/257 |
| 2003/0144068 | A1 * | 7/2003 | Yang | 473/280 |
| 2008/0271333 | A1 * | 11/2008 | Sung et al. | 33/562 |
| 2010/0095858 | A1 * | 4/2010 | Krikorian | 101/35 |
| 2010/0130299 | A1 * | 5/2010 | Womersley et al. | 473/268 |
| 2012/0258815 | A1 * | 10/2012 | Barrett | 473/226 |

* cited by examiner

*Primary Examiner* — Laura Martin

*Assistant Examiner* — Rhyan C Lange

(74) *Attorney, Agent, or Firm* — Patricia M. Costanzo, Esq.

(57) ABSTRACT

Sight alignment indicia on a sphere being indicia made on opposing sides of a sphere, the indicia positioned from about 0 degrees to 23 degrees north of the equator of the sphere, and visible at the same time to one standing over the ball. A sphere surface template marking device comprising a shell having an outer-surface and inner-surface generally defining a hemi-spherical portion of a sphere adapted for receiving a portion of the sphere so that the inner-surface substantially conforms thereto, the shell having an edge portion approximating the equator of the sphere, at least two grooves disposed there through, with the grooves positioned on opposing sides of said shell from about 0 degrees to 23 degrees north of the edge portions of the sphere, serving to receive and guide a marker imprinting indicia on said surface of said sphere.

19 Claims, 5 Drawing Sheets

DEVICE AND METHOD FOR MARKING SPHERES WITH ALIGNMENT INDICIA AND THE SPHERE SO MARKED

CROSS-REFERENCE TO RELATED APPLICATIONS

This is a Non-Provisional application of U.S. Provisional Patent Application No. 61/551,064 filed on Oct. 25, 2011.

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISK APPENDIX

Not Applicable

BACKGROUND

The present invention relates generally to spheres marked with indicia for alignment purposes and, more particularly, to a method for marking spheres with indicia for alignment purposes, a device for imprinting the alignment indicia of the present invention on a sphere, and a sphere so marked.

The background information discussed below is presented to better illustrate the novelty and usefulness of the present invention. This background information is not admitted prior art.

There are many instances where a perfect alignment of a sphere on a surface is required. One of the easiest to understand examples is provided by a golf ball. Golf is a precision sport, in which competing golfers use many types of clubs to hit golf balls into a series of holes on a golf course using the fewest number of strokes. Golf balls are readily available marked with alignment indicia that act as guides, helping the golfer to strike the golf ball in the correct manner.

The object of the game is to get a golf ball from the area where the game begins, commonly referred to as the "teeing ground", into a particular hole with the fewest number of strokes. A "round is based on playing a number of holes in a given order and typically consists of either eighteen holes that are played in the order determined by a golf-course's layout or of a nine-hole course. The game starts when a golfer strikes a golf ball with a club, referred to as teeing. For this beginning shot, golfers frequently suspend the ball on a "tee" prior to striking it. A tee is a small peg with a supporting surface area on which a golf ball is placed to elevate it slightly above the ground. After the first strike, once the ball comes to rest, the golfer strikes it repeatedly until the ball reaches the green. Once the ball is on the green, the ball is then "putted" using a golf club known as a "putter" to roll the ball across the green into the cup. The putter is used in short distance shots on or near the green. The goal of the putt is to get the ball in the hole.

To get the ball to move along the intended precise line of direction between the ball and the cup requires that: (1) the ball be struck so that the striking surface of the golf club remains strictly perpendicular to the direction of club head travel during the putting stroke, and (2) the club head must be moved along the precise direction line of the putt to avoid hitting the ball off-line or imparting an undesired roll to the ball. However, most golfers have difficulty properly aligning a putter club head with their golf ball. Proper putting alignment is a difficult aspect of the game but is required for accurate putting, which is necessary for a good golf score. Achieving proper putting alignment, often referred to as the "address position" is essential.

One way of assisting the golfer in the goal of getting the ball into the hole is to use golf balls that are provided with, what is referred to as, an "equatorial marking line" on the ball, so that a golfer can observe how straight the ball he just putted is rolling across the green. Such a line, like the equator of a sphere, is always a "great circle". Such a line, may in general, be referred to in the art as an alignment line and may be a continuous line or a series of short lines. A ball marked with such an equatorial marking line, must be correctly positioned for striking. The proper position for striking a marked golf ball is to have the equatorial line positioned within a vertical plane that is simultaneously perpendicular to the horizontal plane, which can be approximated by a flat, level ground surface of the putting green, and to the face of the putter club, as the club strikes the ball. Another aid provided to golfers is a "putter target line." The putter target line is a line drawn across the surface of a putter that is to be aligned with the equatorial line of the golf ball. If the alignment is done correctly and if the golfer is in his or her correct address position, the ball struck by the putter should roll across the green maintaining the equatorial line in a vertical position. If, however, the alignment was not correct, the golfer's address position was off, or if the putting stroke was not accurately directed, the ball will wobble out of verticality. This wobbling is most easily appreciated by watching the wobble of the equatorial line as the ball is traveling. Additionally, there may also be drawn on the ball one or more cross lines referred to as "squareness lines" so that a golfer may more easily maintain the putter face square with the ball.

In order for the golfer to be in correct alignment with the golf ball means that the golfer must position his or her eyes directly over the ball. This can be understood by drawing an imaginary line between a golfer's eyes and the golf ball. For correct alignment, the imaginary line must be vertical with respect to the ground surface and must bisect the ball along an imagined equatorial axis. In this position, the golfer's eyes are directly over the ball. This imaginary line is referred to as "line-of-sight."

SUMMARY

The present inventor realized, however, that even using golf balls marked with an equatorial line, it was not possible for golfers to repeatedly achieve the accurate hits they desired. After studying this situation for some time, the Inventor realized that the equatorial line is able to guide a golfer's putting stroke if, and only if, the equatorial line is positioned exactly perpendicularly to the supporting surface of the ball (assuming in these cases that the support surface is always level) and aligned with the putter's target line, and if the golfer is in the optimal "address position," that is, the golfer's eyes are directly over the ball in the correct line-of-sight.

Accordingly, the present Inventor following his inventive concept created a set of inventive principles, or rules, that provide the means for a golfer to attain the correct line-of-sight position. The very crux of the invention is a set of alignment indicia, that when marked on a golf ball following the principles of the present invention, provide for a golfer to easily, rapidly, and repeatedly attain the correct line-of-sight position. The specifically positioned "line-of-sight" indicia provide for the correct alignment of a golfer's eyes with respect to the equatorial line marked on the ball. The method includes adding an indicia line to each opposing side of a golf ball that is first, or will be, provided with an equatorial indicia.

Each of "line-of-sight" indicia of the present invention must be positioned the same distance from the equatorial line, but on opposite sides of the equatorial line. The distance from the equatorial line should be near to, or, ninety degrees, that is, the position of each "line-of-sight" indicia relative to the equatorial line must describe an angle of as close to ninety degrees as possible while remaining observable to a golfer standing directly over the ball so marked. Thus, the closer the "line-of-sight" indicia of the present invention are to being 180 degrees apart, the more accurate is their positioning ability. These marks should be mirror images of each other. The golfer is correctly positioned relative to the golf ball when the golfer's eyes, or a machine's sensors in the case of assembly line ball marking, can see both the equatorial line and each of the specifically positioned "line-of-sight" indicia applied to the ball on opposite sides of the equatorial line, which means that this position by the laws of physics places the aligner's eyes directly over the equatorial line so that the golfer is in the "line-of-sight" position.

The drawings that follow provide examples of the present inventive principles put into practice, including: (1) a golf ball marking device, (2) a golf ball marked according to the principles of the present invention, and (3) a method for marking a golf ball for a golfer to achieve the correct "line-of-sight" stance. It should be understood that, although the invention is being explained in some detail using a golf ball as the sphere to be marked, any sphere, having any purpose, and of any size could be marked using the device when the device is formed to fit the size of the given sphere following the principles of the present invention or by known printing techniques programmed to mark spheres according to the principles of the present invention.

The example of the golf ball marking device of the present invention as illustrated herein is a hand-held device for marking a sphere with "sight alignment indicia lines", which when used correctly, provides for a golfer to repeatedly and assuredly assume a "line-of-sight" position over the ball, so that the golfer's eyes are aligned directly over the ball. The golf ball marking device is an example of a template to be used by golfers when they want to mark their own golf balls. The illustrated marking device provides templates for stenciling three different types of indicia onto a golf ball. Each of the three template designs can be used when working with a golf ball that has either no indicia markings or was previously marked with known indicia to which a golfer wishes to add the inventive indicia. If the golf ball was previously marked with an equatorial line and squareness indicia, then only the "sight alignment indicia lines" marking templates according to the principles of the present invention need be utilized. The indicia or "sight alignment lines" that are the core of the present invention are able to be marked on individual golf balls either by using the marking device, or by setting up a production-line marking system. Using the "sight alignment lines" of the present invention will guide each golfer into assuming the "line-of-sight" posture. It should be understood that other marking device designs are contemplated and within the scope of the present invention. For example, a marking device offering only the template for marking the "sight alignment lines" of the present invention is contemplated.

Accordingly, the golf ball marking device comprises a cap-shaped form having a concave-shaped interior surface forming a spherical shaped hollow. The radius of curvature of the interior surface of the golf ball marking device is substantially equal to the radius of a standard golf ball. Aligned tabs extend outwardly from opposing edge regions of each side of the marking device. Once the marking device is positioned onto a golf ball, the ball is ready for marking. Linearly arcuate, stencil-like slots or apertures of the marking device provide for marking the ball with three different types of indicia. As mentioned above, a first template aperture provides for marking a golf ball with the line presently known as the "equatorial line". A second template aperture on the marking device comprises a set of apertures that embody the essence of the present invention. In this example, each of the set of two apertures is positioned on the marking device so that a line, or other mark, may be made on each side of the equatorial line, with each mark in mirror-image to the other to create the "line-of-sight" indicia set of the present invention. Each mark is drawn at the same distance from the equatorial line following the positions of the template apertures. These marks are the "sight alignment indicia lines" that guide a golfer into assuming the correct position needed to attain his or her "line-of-sight." That is, by placing a ball marked with "sight alignment indicia lines" according to the principles of the present invention, on the ground so that the plane of the equatorial line is perpendicular to the horizontal plane (see Definition Section) and by standing so that both of the sight alignment lines are visible to the golfer at the same time, along with, of course the equatorial line, the golfer is assured of having achieved the desired "line-of-sight" position. A third set of stencil slots or apertures may be provided in the caps to permit markings on a golf ball that assist golfers in guiding strokes other than putting, such as cross lines referred to as "squareness lines" that provide for a golfer to more easily maintain the putter face square with the equatorial line.

A marker pen may be used to draw the lines or line segments through the stencil slots onto the golf ball, although any preferred marking means may be used. For example, the indicia may be marked by pen, or by spray of a marking agent, or by press printing. In an assembly line process, the marking device may not be required. There are many ways to print indicia on an object. For example, a computer program can be easily drafted to follow the principles of printing the "line-of-sight" indicia in the required positions on a ball or other sphere that needs to be aligned for any purpose.

Still other benefits and advantages of this invention will become apparent to those skilled in the art upon reading and understanding the following detailed specification and related drawings.

BRIEF DESCRIPTION OF THE DRAWINGS

In order that these and other objects, features, and advantages of the present invention may be more fully comprehended and appreciated, the invention will now be described, by way of example, with reference to specific embodiments thereof which are illustrated in appended drawings wherein like reference characters indicate like parts throughout the several figures. It should be understood that these drawings only depict preferred embodiments of the present invention and are not therefore to be considered limiting in scope, thus, the invention will be described and explained with additional specificity and detail through the use of the accompanying drawings, in which.

A LIST OF REFERENCE NUMBERS AND THE PARTS TO WHICH THEY REFER

Figure 1A:
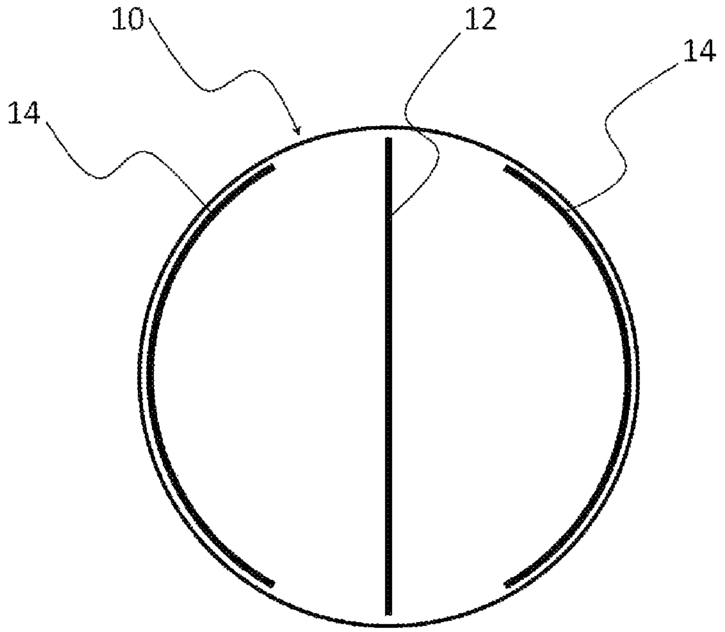
FIG. 1A is a top view of a golf ball marked according to the present invention.

10 A golf ball marked according to the present invention.
11 A golf ball.
12 An equatorial line.
14 A sight-alignment line.
16 A putter.
18 Putter lines to be aligned with equatorial line 12.
20 An example of a sight-alignment line marking device.
22 Template space for marking an equatorial line on a golf ball.
24 Template space for marking a sight-alignment line on a golf ball.
28 Template space for marking square-ness indicia on a golf ball.
30 Optional handle.
32 An example of an advertisement marking.

It should be understood that the drawings are not necessarily to scale. In certain instances, details which are not necessary for an understanding of the present invention or which render other details difficult to perceive may have been omitted.

DEFINITION SECTION

Equatorial putting alignment line, as used herein, refers to a great circle line drawn around a sphere, such as a golf ball. The visual aid of the equatorial putting alignment line is meant to help align putts correctly. Most putters are sold with some sort of alignment aid, such as a line that is to be aligned with the equatorial putting alignment line.

Great circle, as used herein, refers to a circle drawn on a sphere that has the same center and radius as the sphere, and consequently divides the sphere into two equal parts.

Horizontal plane, as used herein, refers to a plane that is horizontal at a given point if it is perpendicular to the gradient of the gravity field at that point, in other words, apparent gravity is what makes a plumb bob hang perpendicular to the plane at that point. In other words a horizontal plane in the plane that is perpendicular to the line that passes through the center of the Earth.

Oval, as used herein, refers to a plane curve that resembles the outline of an egg or an ellipse. In particular, the common traits that these curves have are: they are differentiable (smooth-looking), simple (not self-intersecting), convex, closed, plane curves; their shape does not depart much from that of an ellipse, and there is at least one axis of symmetry.

Ovoid, as used herein, refers to a 3-dimensional surface generated by rotating an oval curve about one of its axes of symmetry.

Sphere, as defined herein, is a perfectly round geometrical object in three-dimensional space, such as the shape of a ball. Like a circle, which is in two dimensions, a sphere is the set of points which are all the same distance r from a given point in space. This distance r is known as the "radius" of the sphere, and the given point is known as the center of the sphere. The maximum straight distance through the sphere is known as the "diameter". It passes through the center and is thus twice the radius. A great circle is a circle on the sphere that has the same center and radius as the sphere, and consequently divides it into two equal parts. Pairs of points on a sphere that lie on a straight line through its center are called antipodal points. If a particular point on a sphere is (arbitrarily) designated as its north pole, then the corresponding antipodal point is called the south-pole and the equator is the great circle that is equidistant to them. Great circles through the two poles are called lines of longitude, and the line connecting the two poles is called the axis of rotation. Circles on the sphere that are parallel to the equator are lines of latitude.

Template, as used herein, refer a stencil, pattern, or overlay as used in graphic arts (drawing, painting, etc.) and sewing to replicate letters, shapes or designs.

Vertical plane, as used herein, refers in astronomy, geography, geometry, and related sciences and contexts, to a direction passing by a given point if it is locally aligned with the gradient of the Earth's gravity field, i.e., with the direction of the gravitational force (per unit mass, i.e. gravitational acceleration vector) at that point.

DETAILED DESCRIPTION

Referring now, with more particularity, to the drawings, it should be noted that the disclosed invention is disposed to embodiments in various sizes, shapes, and forms. Therefore, the embodiments described herein are provided with the understanding that the present disclosure is intended as illustrative and is not intended to limit the invention to the embodiments described herein.

The present invention is directed towards a marking device for marking a sphere, a sphere marked according to the principles of the present invention, and a method for marking a sphere that requires a specific orientation. According to the principles of the present invention, the inventive markings to be marked on a sphere are alignment indicia that can be described as two indicia placed on a sphere so that they are on opposing sides of the sphere with each of the indicia equidistant north of the equator of the sphere and positioned at about 0 degrees to 23 degrees north of the equator of the sphere, and where each of said indicia must be visible at the same time to one viewing the ball from directly overhead. According to the principles of the present invention, the device or template for marking the surface of a sphere comprises a shell having an outer-surface generally defining a hemi-spherical portion of a sphere, an inner-surface generally defining a hemi-spherical portion of the sphere, and is adapted for receiving a portion of the sphere so that the inner-surface substantially conforms thereto, where the shell has an edge portion approximating the equator of the sphere, two grooves disposed there through, and where the grooves positioned on opposing sides of said shell from about 0 degrees to 23 degrees north of the edge portions of the sphere, and are each designed to receive and guide a marker imprinting indicia on said surface of said sphere. In the examples provided within, a golf ball is the sphere that is to be marked with "sight alignment indicia" that guide a golfer into achieving the "line-of-sight" stance required for successful putting, as explained in some detail above. Although a golf ball provides an excellent example of a sphere that benefits from being marked according to the principles of the present invention and is used herein to illustrate the inventive concept and its principles it should be understood that the concepts of the present invention may be used to mark for orientation purposes any size sphere or other object having an ovoid shape.

Every golfer wants to be able to strike his or her golf ball so that it will move along the intended precise line of direction between the starting position of the ball and the cup into which the ball will ideally come to rest. To assist the golfer, golf balls are often marked with, what is referred to as, an “equatorial marking line” about the ball, so that, for one, a golfer can observe how straight the ball he just putted is rolling across the green. Such a line, like the equator of a sphere, is always a “great circle” that divides the sphere about which it is drawn into two halves. The proper position for striking a marked golf ball is to have the equatorial line positioned within a vertical plane that is simultaneously perpendicular to the horizontal plane or, in other words, to the level ground surface of the putting green and to the striking face of the putter club, as the club strikes the ball. A related aid is a “putter alignment line.” The putter alignment line is a line drawn across the surface of a putter that is to be aligned with the equatorial line of the golf ball. If the alignment is done correctly and if the golfer is in his or her correct address position, the ball struck by the putter should roll across the green maintaining the equatorial line in a vertical position. If, however, the golfer’s address position was off causing the putting stroke to have been not accurately directed, the ball will clearly wobble out of verticality as easily observed by watching the wobble of the equatorial line as the ball is traveling. An essential component of the putt is that the player must be positioned in correct address position.

To be in the correct address position, the golfer must be in alignment with the ball to target line. The correct alignment is achieved when the golfer is positioned so that his or her eyes are directly over the ball. This is not easily achieved! Most golfers believe that they are standing with their eyes directly over the ball, but most of the time this is not the case. The correct address position has a direct bearing on a golfer’s ability to achieve a repeatable and consistent stroke. The correct eye to ball position can be understood by drawing an imaginary line between a golfer’s eyes and the golf ball. For correct alignment, the imaginary line must be vertical with respect to a level ground surface and must bisect the ball along an imagined equatorial axis. In this position, the golfer’s eyes are directly over the ball. This imaginary line is referred to as the “line-of-sight.” However, differences in height, weight, and posture leads different golfers to assume different stance positions and if a line could be drawn from between the golfer’s eyes and the ball to be struck, the line would clearly show that the golfers eyes are not directly over the ball, but usually outside or inside the ball to target line. No matter how hard the golfer practices, as long as the golfer does not learn to assume the correct address position, his or her game will not see the desired improvement. The present invention provides golfers with the tool they need to be able to repeatedly, quickly, and easily assume the correctly aligned address position by providing the golfer with alignment aids that can be marked right on the golf ball.

Turning now to the drawings, FIG. 1A, a perspective top view, illustrates golf ball 10 marked with known equatorial line 12 and sight alignment lines 14 of the present invention. These sight alignment lines are the tools provided by the present invention that enable any golfer to repeatedly, quickly, and easily assume the correctly aligned address position. As explained above, equatorial line 12, is routinely provided on golf balls to assist golfers in lining up their putt, by aligning the equatorial line with the lines provided on a putter, to help golfers understand the outcome of their strike. One of the two sight alignment indicia lines 14 of the present invention is positioned on one side of equatorial line 12 and the other sight alignment indicia line 14 is positioned on the other side of equatorial line 12 so that both lines are at equal distances from equatorial line 12. An ideal distance between the equatorial line and each of the sight alignment indicia is for each sight alignment indicia line to be as far as possible from the equatorial line while both remain visible when viewed from above.

Figure 1B:
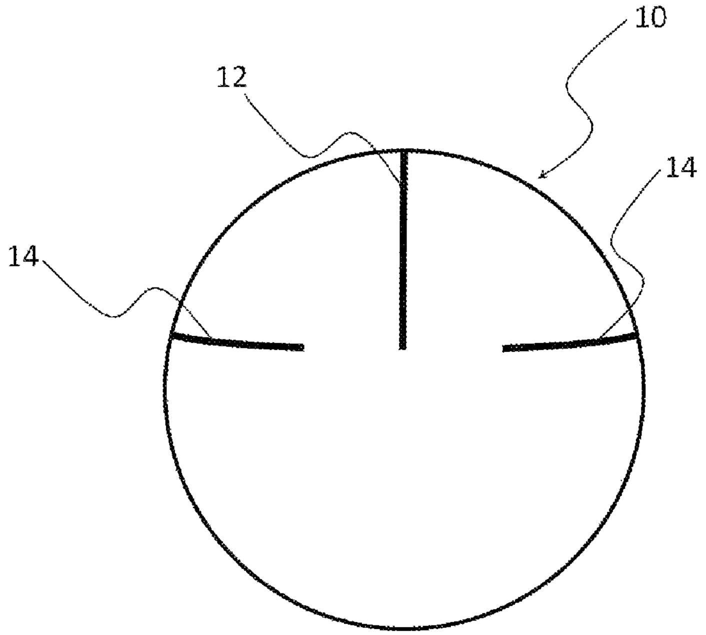
FIG. 1B is a side view of a golf ball marked according to the present invention.
Figure 1C:
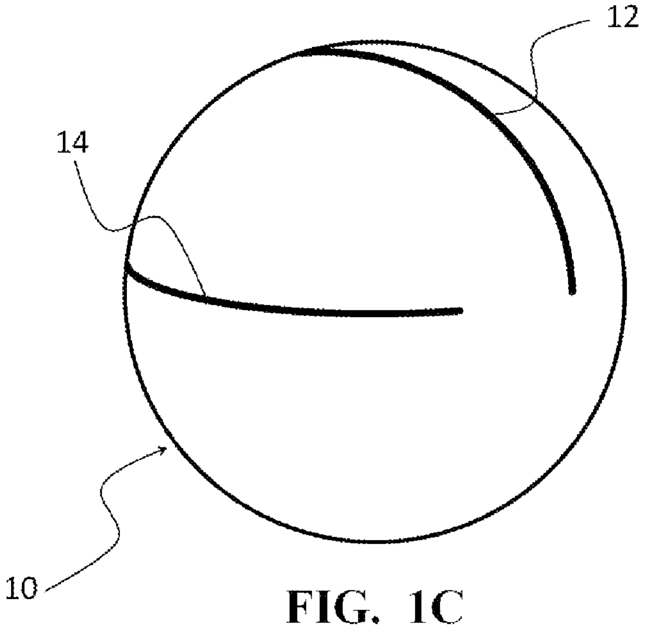
FIG. 1C is another side view turned nearly ninety degrees from the view as shown in FIG. 1B.
Figure 1D:
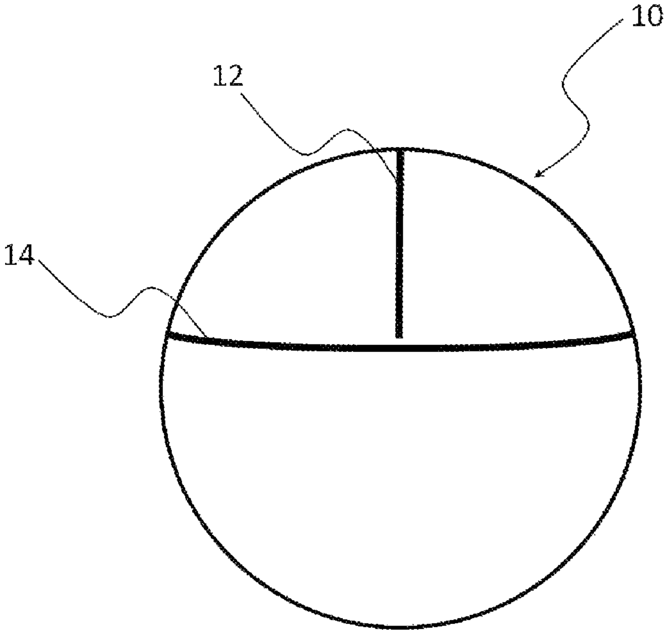
FIG. 1D is a side view of a golf ball marked according to the present invention.
Figure 1E:
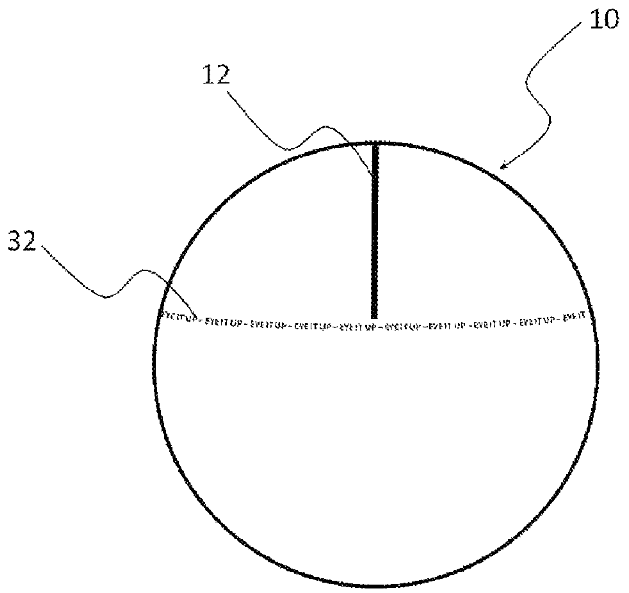
FIG. 1E is a side view of a golf ball marked according to the present invention.

In one preferred embodiment, the lines used as the sight alignment lines each are positioned so as to make a 90 degree angle with the equatorial line. This can be done if the lines are of a thickness that allows each line to be visible on both sides of the equatorial line at the same time to the golfer standing above the ball. In another preferred embodiment, the sight alignment lines are thinner, so are positioned on the ball so that they can be said to be positioned at 23° N. In this case the sight alignment lines need to be no thicker that the equatorial line to be easily visible to the viewer standing over a correctly positioned ball. It should be understood that the equatorial line or the sight alignment lines or both may consist of a line segment, as illustrated in FIGS. 1A, 1B, and 1C. FIG. 1B, a side view, illustrates a golf ball marked with equatorial line 12 and sight alignment lines 14, and shows the relationship between the two types of indicia printed on the ball as line segments. In this example, sight alignment lines 14 are positioned at 23° N on each side of equatorial line 12. FIG. 1C is a side view turned 90 degrees from the view shown in FIG. 1B. FIG. 1D illustrates the sight alignment lines drawn as a continuous line, that is, a continuous line about the entire ball. FIG. 1E illustrates a ball that is marked with a sight alignment line that is partially constructed of text. The line is also contemplated to be constructed, partially or wholly or graphics, as long as the text or graphics are positioned on each side of the equatorial line to act as alignment positioning indicia. It should be realized that any of the indicia may consist of solid or broken lines or any series of marks, including text that will act as alignment positioning indicia. In some instances the sight alignment indicia, could also serve as advertising or promotional material.

Figure 2:
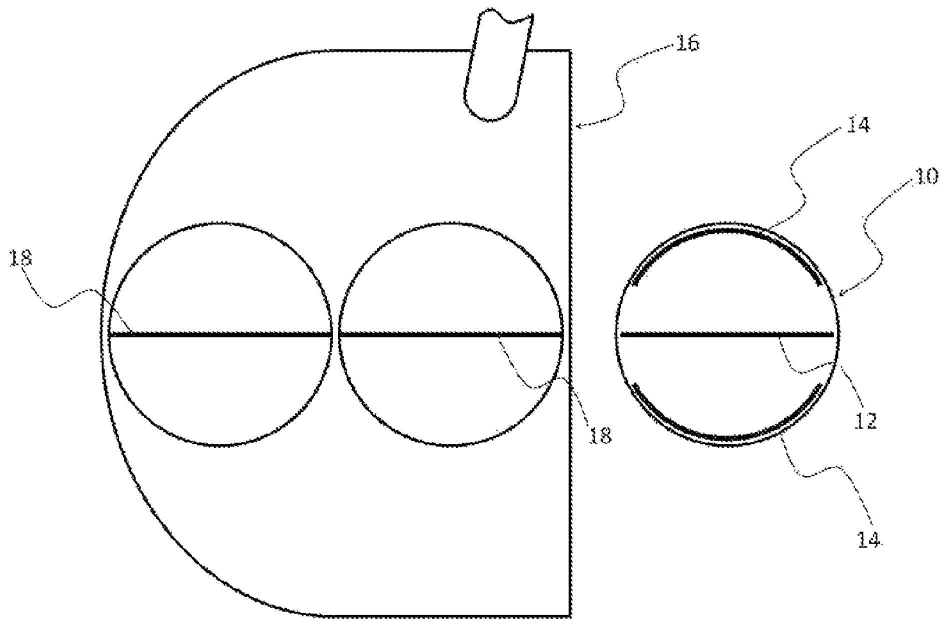
FIG. 2 is a top view of a ball marked according to the present invention in alignment with a marked putter club.

FIG. 2, a top view, illustrates a golf ball marked according to the present invention in alignment with a marked putter club. The two sight alignment indicia 14 are clearly visible on each side of equatorial line 12. Equatorial line 12 is in alignment with the putter lines 18 on putter 16. This alignment is perfect, as both sight alignment lines 14 on the marked golf ball are visible to a golfer standing with his or her eyes directly overhead forming the hypothetical sight line from the golfer’s eyes to the golf ball. When a golfer, who is preparing to putt, can see this alignment, the golfer knows that his or her address position is correct.

Figure 3A:
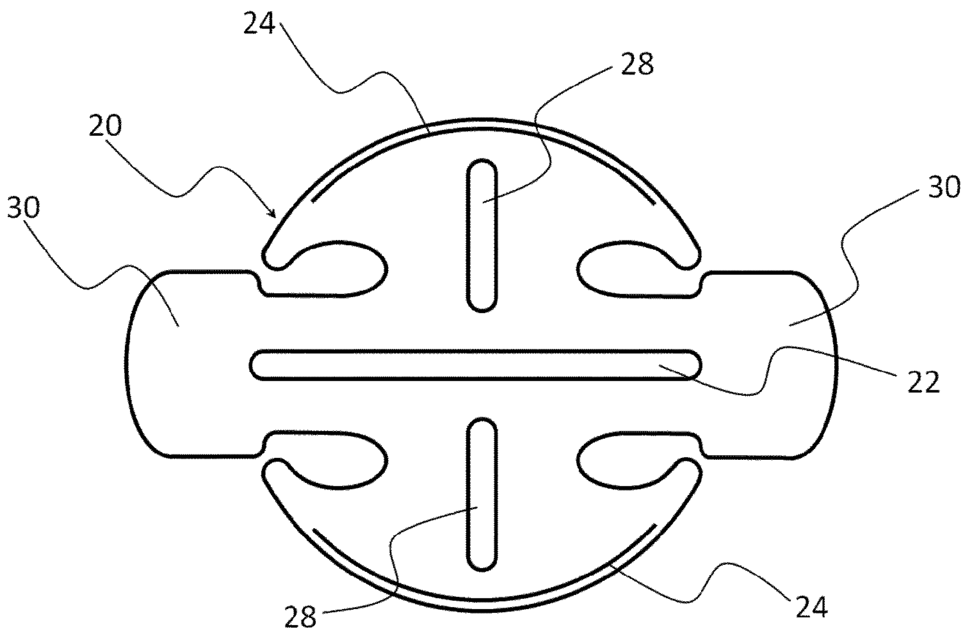
FIG. 3A is a top view sketch of the marking device of the present invention.

FIG. 3A, a top sketch view, provides an example of the marking device of the present invention. The marking device may be referred to as a template that is used as a stencil. The template, illustrated in the figure, offers three sets of indicia marking spaces that include equatorial space 22, squareness indicia space 28, and sight-alignment indicia space 24, along with optional grasping handles 30.

Figure 3B:
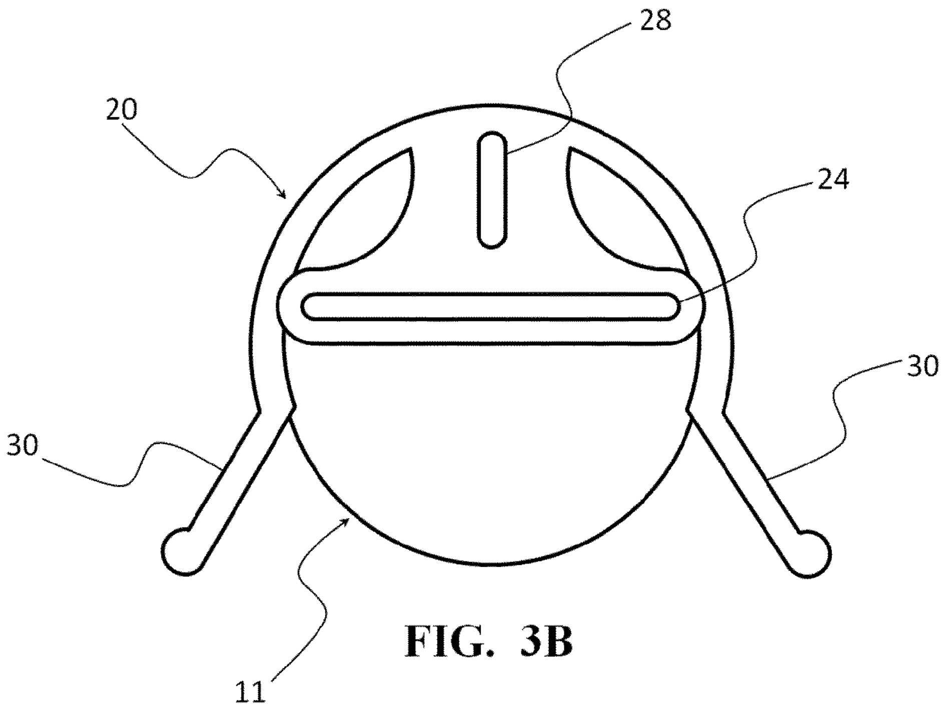
FIG. 3B is a side view sketch of the marking device of the present invention positioned on a golf ball.
Figure 3C:
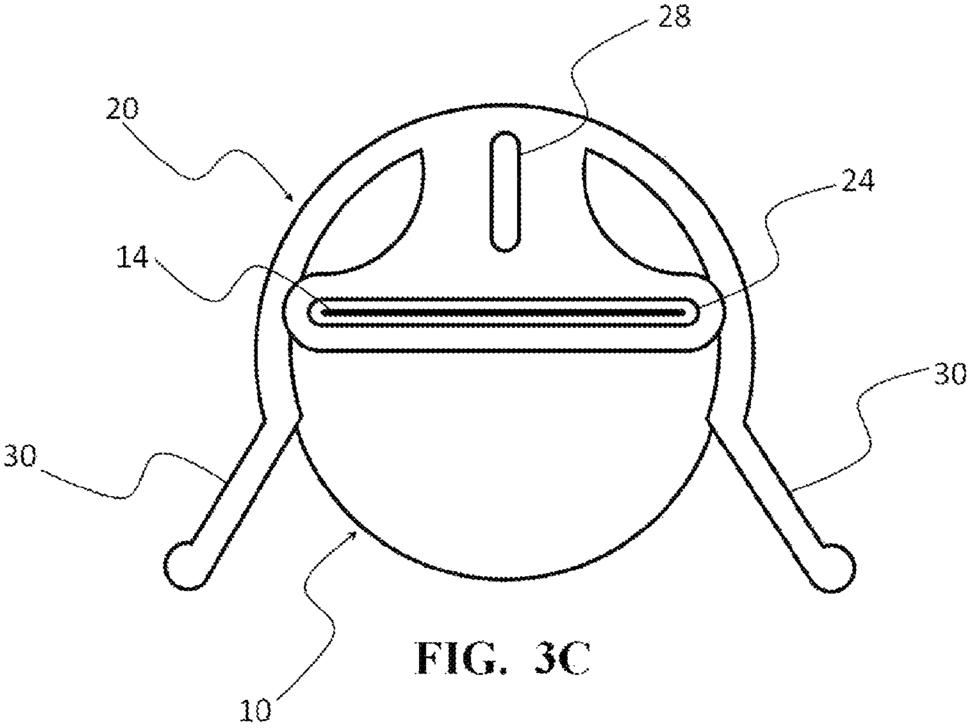
FIG. 3C is a side view sketch of the marking device of the present invention positioned on a golf ball with a sight alignment line marked on the golf ball.

FIG. 3B, a side view, illustrates the marking device as shown in FIG. 3A, positioned for use over a golf ball. One sight-alignment indicia space 24 is clearly visible in this drawing as is one squareness indicia space 28. FIG. 3C, is the same as FIG. 3B in that it is a side view of the marking device as shown in FIG. 3A, positioned over a golf ball, but in this figure sight-alignment indicia 14 has been placed on to the golf ball using the space 24.

The foregoing description, for purposes of explanation, uses specific and defined nomenclature to provide a thorough understanding of the invention. However, it will be apparent to one skilled in the art that the specific details are not required in order to practice the invention. Thus, the foregoing description of the specific embodiment is presented for purposes of illustration and description and is not intended to be exhaustive or to limit the invention to the precise form disclosed. Those skilled in the art will recognize that many changes may be made to the features, embodiments, and methods of making the embodiments of the invention described herein without departing from the spirit and scope of the invention. Furthermore, the present invention is not limited to the described methods, embodiments, features or combinations of features but include all the variation, methods, modifications, and combinations of features within the scope of the appended claims. The invention is limited only by the claims.

What is claimed is:

1. Alignment indicia on a sphere, comprising:

a sphere having:

an equatorial line defining a plane positioned perpendicularly to a plane of an equator of the sphere;

line-of-sight indicia on opposing sides of said sphere such that the position of each indicium relative to the equatorial line describes an angle of as close to ninety degrees as possible providing that said indicia are positioned equidistant within the range from about 10 degrees to about 23 degrees north of the equator of the sphere, and that said indicia being a guide for correct alignment of a golfer's address position only when each of said indicia are visible to said observer standing directly above the sphere.

2. The alignment indicia, as recited in claim 1, wherein each of said indicia comprises being positioned equidistant from about 18 degrees to about 20 degrees north of the equator of the sphere.

3. The alignment indicia, as recited in claim 1, wherein each of said indicia comprise a continuous line.

4. The alignment indicia, as recited in claim 1, wherein each of said indicia comprise a dis-continuous line.

5. The alignment indicia, as recited in claim 1, wherein at least one of said indicia comprises including characters.

6. The alignment indicia, as recited in claim 1, wherein said indicia are positioned equidistant from about 12 degrees to about 23 degrees north of the equator of the sphere.

7. The alignment indicia, as recited in claim 1, wherein said indicia are positioned at about 23 degrees north of the equator of the sphere.

8. The alignment indicia, as recited in claim 1, wherein said sphere is a golf ball.

9. The alignment indicia, as recited in claim 8, wherein said alignment indicia have an imaginary plane equidistant between them that is perpendicular with respect to an equatorial plane of said golf-ball.

10. The alignment indicia, as recited in claim 9, wherein said alignment indicia positioned correctly when both are visible to a golfer standing with his or her eyes directly overhead the golf ball that is positioned on.

11. A sphere surface template marking device for marking the surface of a sphere, said device comprising:

a hemi-spherical shell adapted for receiving a portion of a sphere so that an inner-surface of said shell substantially conforms thereto, said shell having an edge portion approximating an equator of the sphere, said shell having at least two grooves disposed there through, said grooves positioned on opposing sides of said shell from just greater than about 0 degrees up to 23 degrees north of the edge portions of the sphere, and said grooves each serving to receive and guide a marker imprinting indicia on said surface of said sphere, said indicia positioned about just greater than about 0 degrees up to 23 degrees north of and parallel to the equator of the sphere.

12. The device, as recited in claim 11, wherein said sphere is a golf ball.

13. The device, as recited in claim 11, wherein said indicia are sight-alignment indicia.

14. The device, as recited in claim 11, further including an additional groove for imprinting an additional indicia on said surface of said sphere.

15. The device, as recited in claim 14, wherein said additional groove is for imprinting an equatorial line on said surface of said sphere.

16. The device, as recited in claim 15, wherein another additional groove is for imprinting squareness indicia on said surface of said sphere.

17. The device, as recited in claim 11 further including grasping handles (30).

18. Golf-ball indicia, comprising:

a set of line-of-sight address-position indicia, marked on opposing sides of a golf-ball, such that the position of each indicia relative to the equatorial line must describe an angle of as close to ninety degrees as possible while each indicia remains observable to a golfer standing directly over said sphere, said line-of-sight address-position indicia able to guide a golfer to achieve a correct address position, each of said indicia positioned at the same distance from the equator of the golf-ball, said distance defined as being within the range of from about 0 degrees to 23 degrees north of the equator of the golf-ball, so that when each of said indicia are visible to a golfer standing over the ball the golfer is in the correct address position.

19. The golf-ball indicia, as recited in claim 18, wherein there is an equatorial putting alignment line on said golf ball.

* * * * *